Figure 1:
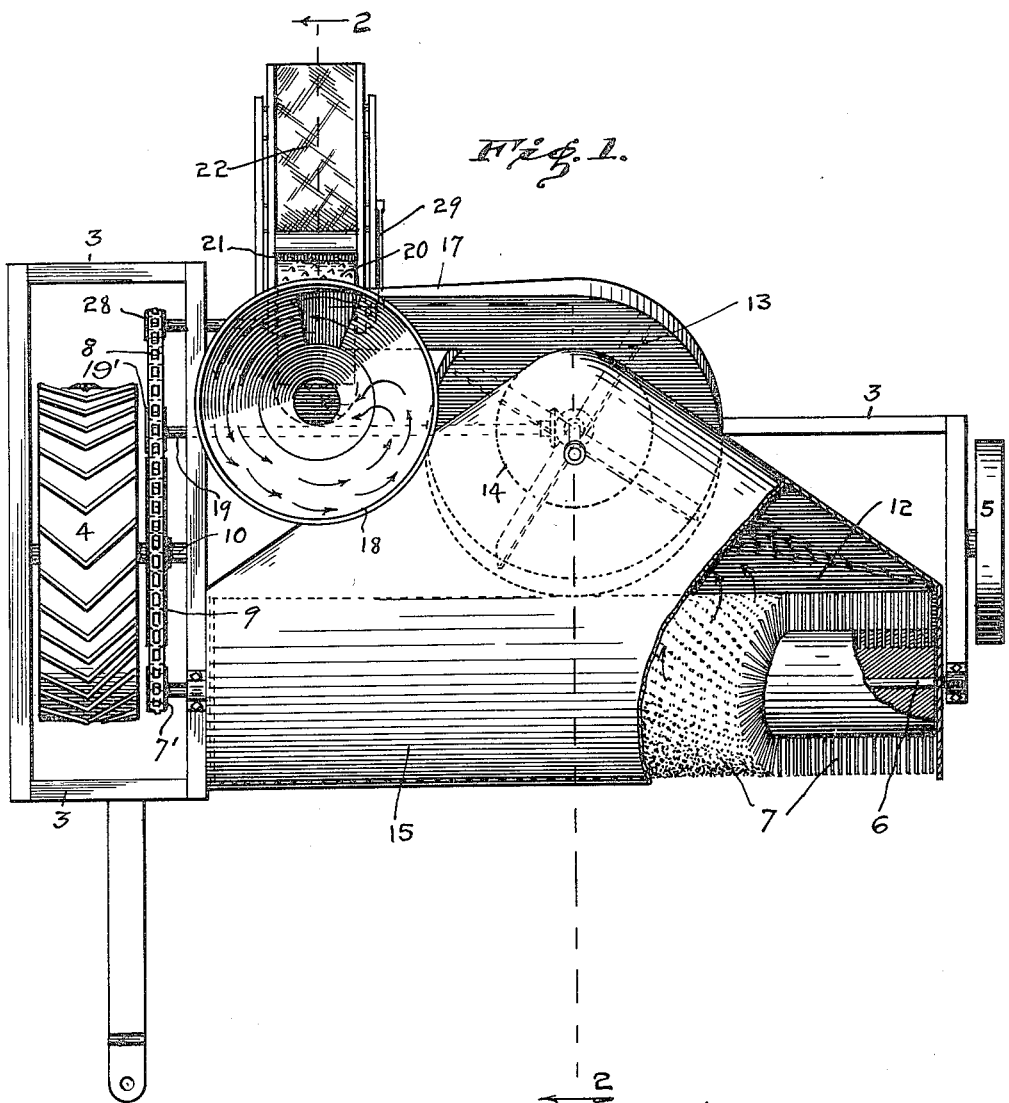

J. HERR.
SEED HARVESTER AND CLEANER.
APPLICATION FILED JAN. 30, 1917.

1,297,349.

Patented Mar. 18, 1919.
2 SHEETS—SHEET 1.

Inventor,
John Herr,
By Minturn T. Werner,
Attorneys.

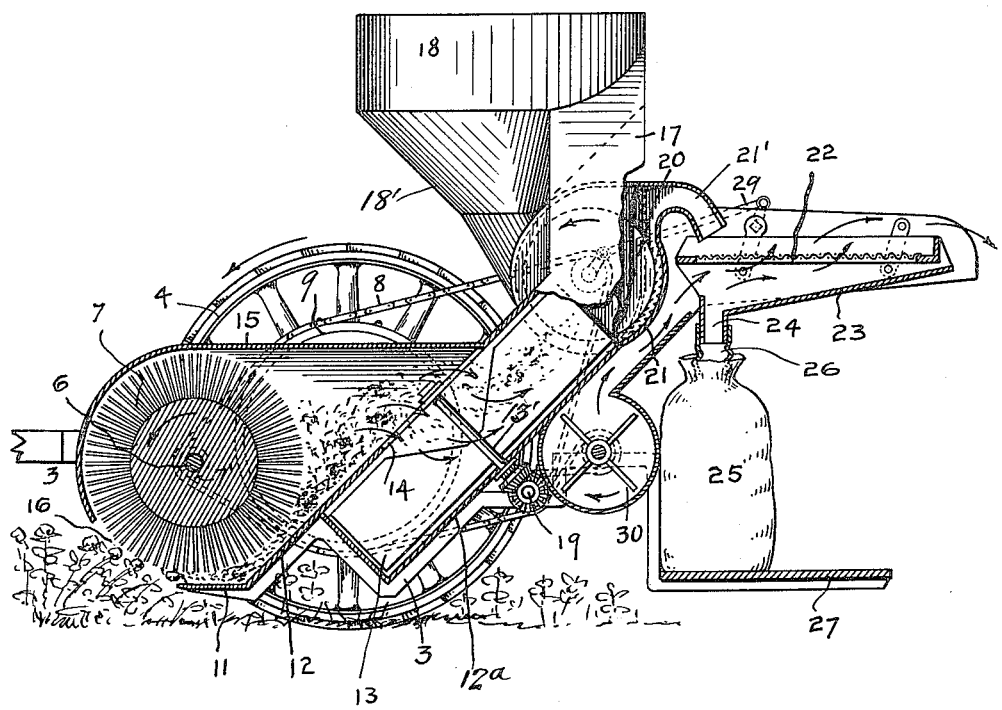

UNITED STATES PATENT OFFICE.

JOHN HERR, OF NEAR LEBANON, INDIANA.

SEED HARVESTER AND CLEANER.

1,297,349. Specification of Letters Patent. Patented Mar. 18, 1919.

Application filed January 30, 1917. Serial No. 145,509.

*To all whom it may concern:*

Be it known that I, JOHN HERR, a citizen of the United States, residing near Lebanon, in the county of Boone and State of Indiana, have invented certain new and useful Improvements in Seed Harvesters and Cleaners, of which the following is a specification.

This invention relates to improved means for harvesting small seeds as bluegrass, clover, and the like, and while particularly devised for the harvesting of clover seed because of the great commercial value of that crop, its novel features are useful with no changes or at least with small or obvious changes, for harvesting other hull incased seeds.

The prevailing method of harvesting clover seed is to mow the field when the crop is of average ripeness. Some of the heads then will be overripe causing the seeds to shatter out and become lost, while many others will yet be too green. The cut product is left in bunches in the field to dry and cure and these bunches must be turned to make the particles dry evenly. As rains are common during this harvesting season the bunches when rained upon must be additionally turned after every shower to avoid molding, which involves labor, expense and loss of seeds shattered off by the operations. Also, the seeds frequently sprout after being wet and they are always discolored and impaired in commercial value by wetting.

While the crop is curing all use of the field for pasture or any other purpose is prohibited. Besides, all pasturage has been cut from the field in the process of harvesting and when the crop is sufficiently cured it is hauled away and is fed through a hulling machine which disintegrates all but the seeds into a dust which is of no feeding value and which is generally allowed to lie where it falls as not worth further handling. It is found in the end, sometimes, that the cost of harvesting as commonly practised, has amounted to more than the value of the seed obtained.

The object of my invention is to take nothing from the plants but the hulls containing the ripe seeds, leaving the rest of those plants and all of the plants not sufficiently matured, intact, for pasturage, or for further maturity and a later harvest. The object also is to provide means for ascertaining the value in yield of a field before much labor has been expended in harvesting it, thereby avoiding all uncertainty as to its value.

The object is to reduce the cost of production by saving the necessity for and cost of cutting the crop, and consequently the cost of turning it to cure and dry it, and the waste and loss from shattering by turning; and the object is to reduce the cost of hulling by passing nothing but the hull inclosed seeds through a huller carried through the field as a part of my harvesting machine.

An additional object is to improve the quality of the seed by taking the filled hulls in a thoroughly ripe, dry, bright, and perfect condition, directly from the rooted plant to the huller, and to provide a machine which will reject buckhorn and other plantains and undesirable seeds of a similar character.

The object finally is to leave all of the plants intact except for the removal of the hulls with the ripened seeds, and standing in the field, ready for a later harvest when more mature, or for immediate use for pasture, or where it will be needed as a fertilizer.

I accomplish the above objects by the mechanism illustrated in the accompanying drawings, in which—

Figure 1 is a top plan view and partial section of my complete machine, and Fig. 2 is a vertical section on the irregular line 2—2 of Fig. 1.

Like characters of reference indicate like parts throughout the several views of the drawings.

The frame 3 of my machine is of any usual and suitable construction, and is here shown as supported upon two wheels 4 and 5. The former is much the larger of the two and when the machine is drawn across the field by animal power this wheel will be the driver from which the other operative parts will be operated. While I have here illustrated a horse-drawn machine, it may be drawn or pushed by any of the usual power tractors, power from which may also be used for driving the several mechanisms of my harvester.

Journaled in suitable boxes on the frame is a horizontal shaft 6, mounted in a fixed manner on which is a wire brush 7. On the end of the shaft 6 next to the traction wheel 4, is a small sprocket wheel 7' which is driven by a chain belt 8 from a large sprocket wheel 9 fixed on axle 10 on which the traction wheel 4 is mounted, also in a fixed manner. Under the rear portion of the rotating brush 7 is a horizontal table 11, which momentarily arrests the rearwardly bending of the stalks at the time the heads are being removed, and merges in an upwardly oblique extension 12, here shown as also forming one of the flat sides of the housing 12ª for an air fan 13. The eye 14 of the fan is through the oblique wall 12. A suitably shaped hood 15, with said members 11 and 12, forms a closure for the rotating brush which is practically air tight save said fan eye and a longitudinal narrow space 16 just in front of the table 11, provided to allow the rotating brush to come in contact with the clover heads and loosen the seed-filled pods or hulls which comprise said heads. The seed bearing hulls thus liberated by the rotating brush from the parent plant are drawn into the fan by the suction of the latter, and are discharged from the fan housing through a chute 17, into a dust collector 18 of usual construction, comprising an open-top cylindrical member with a hopper-shaped bottom 18' through which the seed-filled hulls pass by gravity while the dust and air escape through the open top.

The blades of fan 13 are on a shaft 13' which is driven by bevel gears from a shaft 19, having a sprocket wheel 19' also driven by the link belt 8.

The tapered bottom of the dust collector 18 discharges into a vertical drum which houses a huller cylinder 20 of usual construction, working in conjunction with the usual concave 21 forming part of the drum. The seed bearing hulls drop from the dust collector into the drum where the seed and hulls are separated. The mixed product is thence discharged through a chute 21' upon a vibrating screen 22. The seeds work down by gravity through the meshes of the screen and are deposited upon an oblique table 23, moving with said screen, at the lower end of which table is a spout 24, through which the seeds are discharged into a sack 25, or other receptacle. A flexible hose 26 around the spout and entering the sack prevents the spilling of the seeds by the vibration of the table. The sack is supported upon a platform 27, where the driver who also superintends the operation of the machine will stand; or he may have an assistant who will stand there with him.

The shaft on which the huller cylinder 20 is mounted has a sprocket wheel 28 on one end which is driven by link belt 8 and on its other end is a crank which is connected by a rod 29 with a cranked portion of one of the links suspending screen 22.

The seeds are cleaned of chaff and dust while on screen 22, by an air blast blowing up through the screen from below from a rotary blower 30, located as shown in Fig. 2, under the huller and driven by belt connection from the shaft which supplies the power to the fan 13.

In the operation of my machine, as it is drawn across the field only the hulls of the ripe heads are knocked out of the latter by the brush, and these are drawn immediately into fan 13, and are forced from the latter into the dust collector, and descending there by gravity enter the huller where the seeds are detached from their hulls. Thence the seeds and hulls are discharged upon the vibrating screen through which the heavier bodies—the seeds, are sifted and the hulls in the form of chaff are blown away by a current of air ascending through the screen. Everything but the heads of the ripe clover is left standing and the green stuff will continue to grow and ripen, if that is desired. The harvester can be run over the same field several times as the crop matures and ripens.

While I have described my invention with more or less minuteness as regards details of construction and arrangement and as being embodied in certain precise forms, I do not desire, to be limited thereto unduly or any more than is pointed out in the claims. On the contrary, I contemplate all proper changes in form construction and arrangement, the omission of immaterial elements and the substitution of equivalents as circumstances may suggest or as necessity may render expedient.

I claim:

1. A combined clover seed harvesting and separating machine comprising a revoluble means for detaching the hulls containing the seeds from the stalks and having movement of rotation in a direction of a suction creating element for drawing the freed hulls therein and for discharging same into a dust collector, an open top dust collector interposed between the suction creating element and seed huller for the removal of the lighter particles of the hulls and having its discharge end discharging upon a seed-huller, a seed-huller for separating the hulls from the seeds and discharging them upon a screen, and a vibratory screen for removing the hulls from the loose seeds.

2. A combined clover seed harvesting and separating machine comprising a revoluble means for detaching the hulls containing the seeds from the stalks and having movement of rotation in a direction of a suction creating element for drawing the freed hulls therein and for discharging same into a dust collector, an open top dust collector interposed between the suction creating element and seed huller for the removal of the lighter particles of the hulls and having its discharge end discharging upon a seed-huller, a seed-huller for separating the hulls from the seeds and discharging them upon a screen, a vibratory screen for removing the hulls from the loose seeds, and a delivery chute for catching and guiding the seeds into proper receptacles.

3. A combined clover seed harvesting and separating machine comprising a revoluble means for detaching the hulls containing the seeds from the stalks and having movement of rotation in a direction of a suction creating element, a suction creating element for drawing the detached hulls therein and for discharging them into a cone-shaped dust collector, a cone-shaped dust receiving collector having an air exhaust to the atmosphere and having its discharge end discharging into a seed-huller, a seed-huller for separating the hulls from the seeds and discharging them upon a screen, and a receiving screen for removing the hulls from the loose seeds.

4. A combined clover seed harvesting and separating machine comprising a revoluble means for detaching the hulls containing the seeds from the stalks and having movement of rotation in a direction of a suction creating element, a suction creating element for drawing the detached hulls therein and for discharging them into a dust collector, a dust receiving collector having an air exhaust to the atmosphere and having its discharge end discharging into a seed-huller, a seed-huller for separating the hulls from the seeds and discharging them upon a screen, a hull and seed receiving screen for removing the hulls from the seeds, and a delivery chute for catching and directing the freed seeds into receptacles.

5. A combined clover seed harvesting and separating machine comprising a revoluble means for detaching the hulls containing the seeds from the stalks and having movement of rotation in a direction of a suction creating element, a suction creating element for drawing the detached hulls therein and for discharging them into a dust collector, a vertically disposed dust receiving collector having an open top for escape of air and having its hull discharge end discharging upon a seed-huller, a seed-huller for separating the hulls from the seeds and discharging them upon a screen, a moving screen for removing the hulls from the seeds, and a delivery chute for catching and directing the freed seeds into receptacles.

6. A combined clover seed harvesting and separating machine comprising a revoluble means for engaging and bending the standing clover-stalks rearwardly and for removing the heads from said stalks, means for momentarily arresting the bending movement of the stalks while the heads are being removed, a hood for inclosing said revoluble means and having a common inlet opening for both air and grain, a suction creating element, and a housing inclosing said suction creating element and communicating with the hood for receiving its air supply through the air and grain inlet opening in the latter.

In witness whereof I have hereunto set my hand and seal at Indianapolis, Indiana, this 2nd day of January, A. D. one thousand nine hundred and seventeen.

JOHN HERR. [L. S.]